(12) United States Patent
Chatterjee et al.

(10) Patent No.: US 12,443,525 B2
(45) Date of Patent: Oct. 14, 2025

(54) FABRIC-ATTACHED MEMORY FOR APPLICATIONS USING MESSAGE PASSING PROCEDURE

(71) Applicant: Hewlett Packard Enterprise Development LP, Spring, TX (US)

(72) Inventors: Soumitra Chatterjee, Karnataka (IN); Chinmay Ghosh, Karnataka (IN); Mashood Abdulla Kodavanji, Karnataka (IN); Sharad Singhal, Belmont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 432 days.

(21) Appl. No.: 18/308,953

(22) Filed: Apr. 28, 2023

(65) Prior Publication Data

US 2024/0362163 A1    Oct. 31, 2024

(51) Int. Cl.
*G06F 12/02* (2006.01)
*G06F 13/16* (2006.01)

(52) U.S. Cl.
CPC .......... *G06F 12/0284* (2013.01); *G06F 13/16* (2013.01); *G06F 2213/16* (2013.01)

(58) Field of Classification Search
None
See application file for complete search history.

(56) References Cited

U.S. PATENT DOCUMENTS

| 8,782,164 | B2 | 7/2014 | Chen et al. |
| 2002/0152328 | A1* | 10/2002 | Kagan ............... H04L 49/90 709/250 |

(Continued)

FOREIGN PATENT DOCUMENTS

| GB | 2288957 A | 11/1995 |
| JP | 08-070452 A | 3/1996 |
| WO | 2011/020011 A2 | 2/2011 |

OTHER PUBLICATIONS

Singhal et al., "OpenFAM: A library for programming disaggregated memory", The OpenSHMEM and Related Technologies, Sept 14- 16, 2021, 18 pages.
Singhal et al., "OpenFAM: Programming Disaggregated Memory", Cray Users Group 2022 , 2022, 12 pages.
Wikipedia, "Lustre Object Storage Service (OSS)", available online at <https://wiki.lustre.org/Lustre_Object_Storage_Service_>, Nov. 8, 2017, 5 pages.
"OpenFAM Reference Implementation", available online at <https://ba-ramya.github.io/OpenFAM.github.io/fam_create_region.html>, 2021, 3 pages.
"OpenSHMEM Specification", available online at <https://web.archive.org/web/20210303211945/http://www.openshmem.org/site/Specification/>, Mar. 3, 2021, 1 page.

(Continued)

*Primary Examiner* — Craig C Dorais
(74) *Attorney, Agent, or Firm* — Hewlett Packard Enterprise Patent Department (57) ABSTRACT

Some examples relate to providing a fabric-attached memory (FAM) for applications using message passing procedure. In an example, a remotely accessible memory creation function of a message passing procedure is modified to include a reference to a region of memory in a FAM. A remotely accessible memory data structure representing a remotely accessible memory is created through the remotely accessible memory creation function. When an application calls a message passing function of the message passing procedure, a determination is made whether the remotely accessible memory data structure in the message passing function includes a reference to the region of memory in the FAM. In response to a determination that the remotely accessible memory data structure includes a reference to the region of memory in the FAM, the message passing function call is routed to a FAM message passing function corresponding to the message passing function.

20 Claims, 6 Drawing Sheets

(56) References Cited

U.S. PATENT DOCUMENTS

| | | | | |
|---|---|---|---|---|
| 2012/0110600 A1* | 5/2012 | Carey | ............... | G06F 9/542 |
| | | | | 719/318 |
| 2017/0103039 A1* | 4/2017 | Shamis | ............ | H04L 49/103 |

OTHER PUBLICATIONS

"The Message Passing Interface (MPI) standard", available online at <qmcs.anl.gov/research/projects/mpi/>, Retrieved on Jun. 1, 2023, 2 pages.

"Two-sided communication in MPI. | Download High-Quality Scientific Diagram", available online at <https://www.researchgate.net/figure/Two-sided-communication-in-MPI_fig1_304193117>, 2015, 1 page.

"Window Creation", available online at <https://web.archive.org/web/20201112002109/https://www.mpi-forum.org/docs/mpi-2.2/mpi22-report/node231.htm>, Nov. 12, 2020, 3 pages.

Github, "Open MPI", available online at <https://github.com/open-mpi/ompi/blob/f0101dcf19ee9f10ea76ab423e0b1928cce70bad/ompi/win/win.h>, Jul. 26, 2022, 4 pages.

Github, "OpenFAM: A library for programming Fabric-Attached Memory", available online at <https://openfam.github.io/index.html>, 2021, 4 pages.

Intel, "DAOS and Intel® Optane™ Technology for High-Performance Storage", available online at <https://www.intel.com/content/www/us/en/high-performance-computing/daos-high-performance-storage-brief.html>, 2021, 5 pages.

OpenFabrics Interfaces Working Group, "Libfabric OpenFabrics", available online at <https://ofiwg.github.io/libfabric/> 2023, 3 pages.

OpenSFS and EOFS, "Lustre", available online at <https://www.lustre.org/>, 2023, 3 pages.

Pfister et al., "An Introduction to the InfiniBand™ Architecture", Chapter 42, 2002, 16 pages.

Sensi et al., "An In-Depth Analysis of the Slingshot Interconnect", 2020, 13 pages.

* cited by examiner

FABRIC-ATTACHED MEMORY FOR APPLICATIONS USING MESSAGE PASSING PROCEDURE

BACKGROUND

High-Performance Computing (HPC) generally refers to aggregating computing resources to perform more computing operations at once. HPC encompasses solutions that can process data and execute calculations at a rate that far exceeds other computers. For example, HPC can be used in applications such as oil exploration, drug development, weather prediction, or other scientific projects.

BRIEF DESCRIPTION OF THE DRAWINGS

For a better understanding of the solution, examples will now be described, with reference to the accompanying drawings, in which.

DETAILED DESCRIPTION

High-Performance Computing (HPC) uses parallel processing techniques to solve complex computational problems that are too large or too complex to be solved by traditional computing methods. In parallel computing, multiple compute nodes (e.g., servers) in a cluster can be connected via a fast interconnect. Each node in parallel computing typically works on a portion of the overall computing problem. The challenge is to synchronize the actions of each node, exchange data between nodes, and provide control over the processing elements (PEs). The Message Passing Interface (MPI) defines a standard suite of functions for these tasks.

Message Passing Interface (MPI) is a message passing standard designed to function on parallel computing architectures. MPI provides standardized means of exchanging messages between multiple computers running a parallel program across a distributed system. MPI is used to send messages from one process to another process. These messages can contain data ranging from primitive types (e.g., integers or strings) to user-defined types such as JavaScript Object Notation (JSON) images or binary. The MPI standard defines the syntax and semantics of library routines that could be used for writing message passing programs in programming languages such as C, C++, Java, or Fortran.

Applications that use MPI ("MPI applications") suffer from several challenges. In a typical HPC implementation, with data partitioned across nodes, MPI relies on a heavyweight two-sided messaging model for communication and data movement. The two-sided messaging model is based on send and receive operations. In this model, communication involves both the sender and receiver sides, and synchronization is achieved through communication operations. The two-sided messaging model involves various communications such as memory copy, matching of send and receive operations, and a handshake that leads to significant mediation overheads and performance bottlenecks, both of which may be undesirable.

The MPI standard also provides a one-side communication model. In this model, one process specifies all communication parameters, and the synchronization is done explicitly to ensure the completion of communication. Although one-sided communication avoids mediation overheads, the amount of data that can be held in a compute node is limited by the available host memory. This puts a constraint on using MPI for applications that require memory, which is more than the memory available on a compute node.

Certain embodiments of this disclosure address one or more of these technical challenges by enabling MPI applications to use a Fabric-Attached Memory (FAM). FAM refers to a shared pool of memory that is accessible to one or more processors (e.g., compute nodes in a cluster), over a network fabric. FAM as a concept disaggregates memory from compute resources, allowing memory capacity to grow independently of compute capacity. Since memory is attached to the communications fabric and disaggregated from compute nodes, FAM facilitates efficient computations over much larger data sets than are otherwise practical. FAM is different from conventional memories in the fact that it can be accessed through a network interface.

The traditional model of distributed computing partitions data between compute nodes. Each compute node "owns" its local data and relies on two-sided message passing to coordinate with other nodes. Data owners mediate access to their data, performing work on behalf of the requester. This model suffers mediation overheads. In contrast, the large memory capacity of FAM means that large working sets can be maintained as in-memory data structures. The fact that multiple, and potentially all, compute nodes can share a common view of memory in FAM means that data sharing and communication can be done efficiently. Additionally, data sets no longer need to be partitioned between compute nodes, as is typically done in clustered environments. This avoids message-based coordination overheads. In a FAM-based implementation, any compute node can operate on any part of data, which facilitates more dynamic and flexible load balancing.

Since FAM represents a new architecture, existing Application Programming Interfaces (APIs) do not provide easy-to-use libraries for use by users (e.g., developers). Most existing libraries assume data is held either in persistent storage or in RAM during computation. It is desirable to provide users with libraries that can be used with FAM. One such API is OpenFAM.

OpenFAM is an API specification for programming FAM. OpenFAM is designed to run on current high-performance clusters as well as fabric-attached memory systems. OpenFAM allows users to employ FAM in large clusters that use a fast storage tier. For example, OpenFAM can be used for programming FAM to store large data sets (e.g., data sets that will not fit into the local memory of processors) that arise in applications related to, for example, life sciences, oil exploration, weather prediction, or cyber security.

Certain embodiments of this disclosure leverage OpenFAM to augment the implementation of MPI one-sided communication interfaces (e.g., message passing functions) to enable MPI applications (including existing MPI applications) to handle FAM-resident data. Since a FAM provides a shared pool of memory, enabling MPI applications to utilize a FAM may help MPI applications access a larger memory capacity (than available by a host). Using a FAM may facilitate efficient data sharing for an MPI application since a FAM offers a shared pool of memory, which may provide faster data access due to low latency and high throughput. Using a FAM also may help reduce the memory requirements of individual compute nodes in a cluster since the compute nodes can access a shared pool of memory.

In an example implementation, a remotely accessible memory creation function of a message passing procedure ("MPP") is modified to include a reference to a FAM. The remotely accessible memory creation function creates a remotely accessible memory data structure that represents a remotely accessible memory. Since the remotely accessible memory data structure is created using the modified remotely accessible memory creation function, the remotely accessible memory data structure includes a reference to a region of memory in the FAM. When an application calls a message passing function of the message passing procedure that includes the remotely accessible memory data structure, the message passing function determines whether the remotely accessible memory data structure includes a reference to the region of memory in the FAM. In response to a determination that the remotely accessible memory data structure includes a reference to the region of memory in the FAM, the message passing function call is routed to a FAM message passing function corresponding to the message passing function of the message passing procedure. In this manner, an MPI application can use a FAM and benefit from the advantages provided by the FAM, as enumerated earlier.

Figure 1:
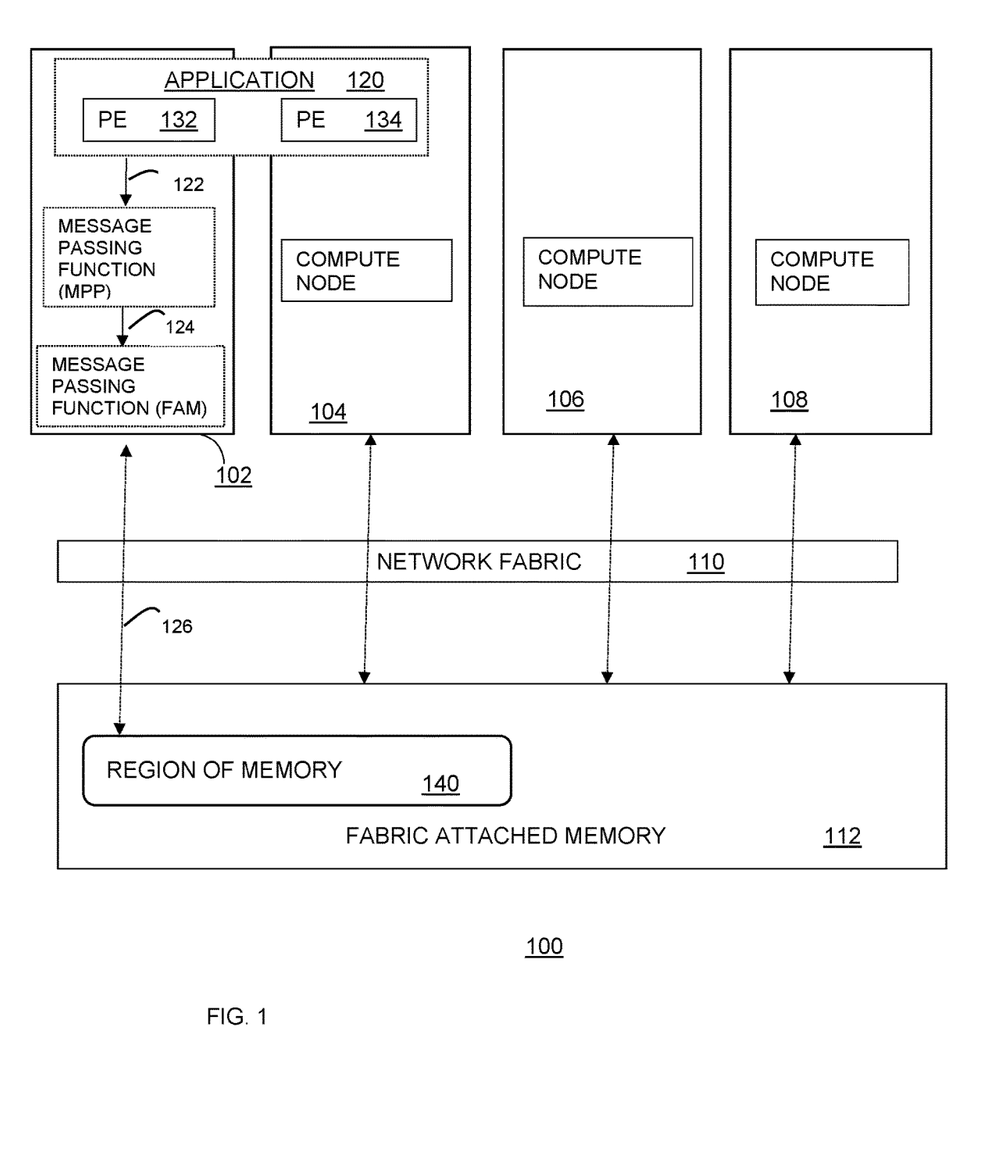
FIG. 1 is a block diagram of a computing environment for enabling an application using message passing procedure to use a FAM, according to some examples.

Referring now to the figures, FIG. 1 is a block diagram of a computing environment 100 that includes compute nodes (e.g., first compute node 102, second compute node 104, third compute node 106, and fourth compute node 108, a network fabric 110, and a FAM 112. In the example of FIG. 1, four compute nodes (102, 104, 106, and 108) are depicted for simplicity. In some examples, computing environment 100 may include a different number of compute nodes. In an example, the computing environment 100 can represent an HPC infrastructure. The HPC infrastructure can be used, for example, to perform complex calculations in various fields (such as oil exploration, drug development, or weather prediction) across compute nodes (102, 104, 106, and 108) in parallel.

The compute nodes (102, 104, 106, and 108) can each include a computer server, a workstation, a desktop computer, a notebook computer, a tablet computer, a thin client, or any other processing device. In an example, the compute nodes (102, 104, 106, and 108) can each include a processor(s). The processor(s) can further include a core(s). The "core" refers to a processing unit built into a processor (or socket) that can independently perform or process a computational task. In an example, the compute nodes (102, 104, 106, and 108) can act as a "cluster" whereby the compute nodes (102, 104, 106, and 108) work together as a single computing resource.

The FAM 112 refers to a shared pool of memory that is accessible to the compute nodes (102, 104, 106, and 108) over the network fabric. The FAM 112 is a byte-addressable memory that uses a bytewise storage configuration. In the bytewise storage configuration, the data space in a cell is equal to 8 bits or 1 byte. The FAM 112 can include volatile memory (e.g., Dynamic random access memory (DRAM)) or non-volatile persistent memory. In one example, the FAM 112 can be accessed through a network interface. In one example, the FAM 112 includes volatile memory on multiple servers.

The compute nodes (102, 104, 106, and 108) and the FAM 112 can be communicatively coupled via the network fabric 110. As used herein, the term "network fabric" refers collectively to network components (e.g., switches or interconnects) and configuration that provides communication between various devices connected to it. In some examples, the first compute node 102, the second compute node 104, the third compute node 106, the fourth compute node 108, and the FAM 112 can be located in different geographical locations.

In an example, each compute node (102, 104, 106, or 108) can include a local memory. As used herein, the term "local memory" refers to a memory that is accessible by a single compute node. The local memory can include, for example, a DRAM or persistent memory.

HPC uses parallel processing techniques to solve complex computational problems that are too large or too complex to be solved by traditional computing methods. In parallel computing, multiple compute nodes (e.g., servers) in a cluster can be connected via a fast interconnect. Each node in parallel computing typically works on a portion of the overall computing problem. The challenge is to synchronize the actions of each node, exchange data between nodes, and provide control over the entire cluster. MPI defines a standard suite of functions for these tasks.

In an example, an application 120 can run on a single compute node (e.g., the first compute node 102) or multiple compute nodes (e.g., the first compute node 102 and the second compute node 104) of the computing environment 100. The application 120 may use parallel computing to solve complex computational problems that are too large or too complex to be solved by traditional computing methods. For example, the application 120 can be used to solve computational problems in various fields, such as manufacturing, financial services, oil exploration, drug development, or weather prediction. The application 120 can use parallel computing to divide a computing problem. In such a case, each compute node in the computing environment may work on a portion of the overall computing problem.

The application 120 can be composed of a group of processing elements (PEs) (e.g., 132 and 134) that cooperate with one another. As used herein, the term "processing element" refers to a thread of execution that performs a task (e.g., reading or writing data). In the example of FIG. 1, two PEs (132 and 134) are depicted for simplicity. In other examples, the computing environment 100 may include a different number of PEs.

The FAM 112 can include a shared persistent memory where PEs (e.g., 132 and 134) may place and access data. The data can be placed in a region of FAM ("FAM region") 140, which is a block of memory, in the FAM 112. The FAM region 140 may have non-functional properties (e.g., resilience or security properties) associated with them. The FAM region 140 can have a name, which can be used by a user (e.g., a programmer) to get a descriptor to the FAM region 140. A "descriptor" is a structure containing information that describes data. In OpenFAM, for example, the fam_allocate function can be used to create a data item of a specified size in a region of the FAM 112.

In an example, if the application 120 runs on a single compute node (e.g., first compute node), then one or more processing elements (e.g., 132 or 134) can be present on the same compute node. In another example, if the application 120 runs on multiple compute nodes (e.g., the first compute node 102 and the second compute node 104), then one or more processing elements (e.g., 132 or 134) can be present on multiple compute nodes (e.g., the first compute node 102 and the second compute node 104). To synchronize the actions of each PE, exchange data between PEs, or provide control over the entire process, a message passing procedure can be used.

As used herein, the term "message passing" refers to the sending of a message to a parallel process, subroutine, function, thread, or object. For example, the invoking program can send a message to a process and rely on that process to select and run an appropriate code. The term "message passing procedure" refers to means (e.g., functions) for exchanging messages between multiple PEs running a parallel program across a distributed system. These messages can contain data ranging from primitive types (e.g., integers or strings) to user-defined objects (e.g., a JSON image or binary). A distributed system refers to a system whose components are located on different networked computers, which communicate and coordinate their actions by passing messages to one another.

The message passing procedure can include a library of functions whose implementations can be used to send messages (e.g., data, instructions, etc.) to other processes in order to perform specific tasks (e.g., reading or writing data). The functions can be implemented in or called from various programming languages such as C, C++, Java, or Fortran to write parallel programs. The message passing procedure can be used to have multiple processes concurrently running on separate compute nodes of the computing environment 100. Each process can be assigned a unique identity and a memory space and can execute independently from the other processes. The processes can communicate with each other by passing messages to exchange data. To solve a complex computational problem, parallel computing is used to partition a program task into small chunks. The chunks can be distributed among the processes, in which each process processes its part. MPI is an example standard of the message passing procedure.

Figure 2:
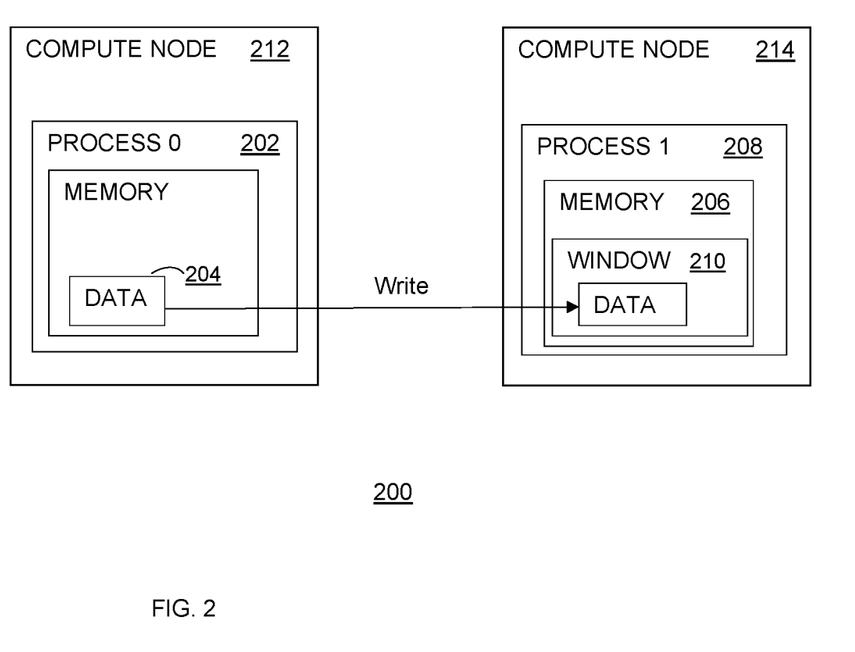
FIG. 2 illustrates a one-sided communication, according to some examples.

In a message passing procedure, both the sender and the receiver can participate in moving data between two processes. In an alternative message passing procedure, one process can control communication. This is called "one-sided communication". In one-sided communication, a process can directly access the memory space of another process without the target process using an explicit receive call. For this reason, one-sided communication is called remote memory access (RMA). FIG. 2 illustrates a one-sided communication, according to an example.

In remote memory access, a process can access data on another process through memory called a "window". As used herein, the term "window" refers to a portion of memory on the target process, which is visible to the origin process to manipulate. A window is used to expose a memory region with which a process can interact one-sidedly. A window acts as a peephole into the memory of a process. A window can be referred to as "remotely accessible memory". FIG. 2 illustrates a window on a target process, according to an example.

Figure 3:
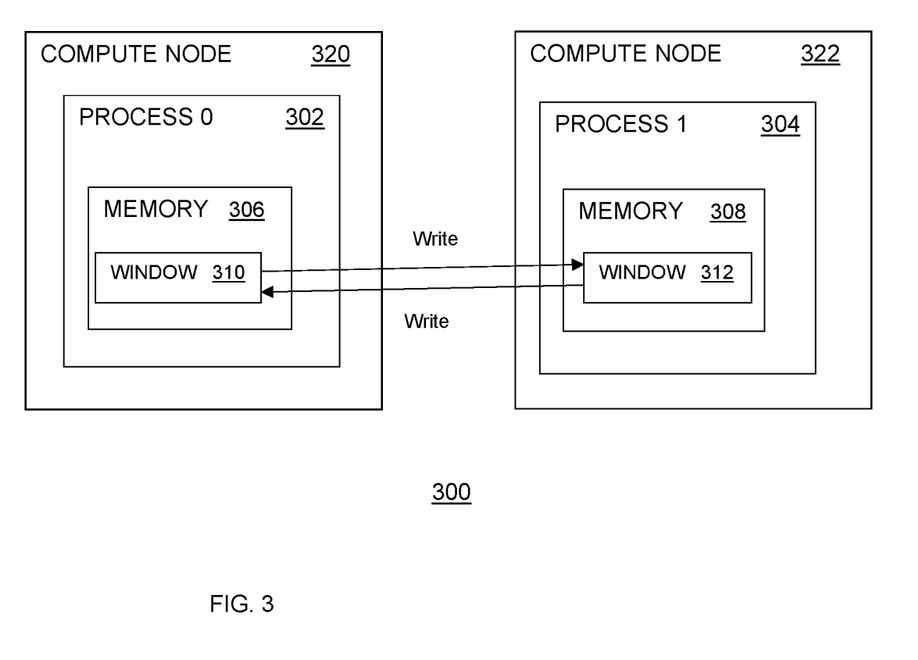
FIG. 3 illustrates a communicator, according to some examples.

In an example, both the origin process and the target process can expose a portion of their memory through their respective windows. In such cases, both processes are part of a communicator in the message passing procedure. As used herein, the term "communicator" refers to an object that defines a group of processes that can communicate with one another. Each process in the communicator is assigned a rank, which is a unique integer. Rank values can range from zero to N−1, where N is the number of processes in the group. Rank can be used to split up work and to allow specific processes to have specific tasks. For example, if the work includes summing up a large number of numbers (e.g., hundreds or thousands of numbers), a root process (Rank 0) can be responsible for sending out the tasks (the numbers to be summed) while all other processes (Ranks 1 to N) can be responsible for summing a list of numbers and returning the results. FIG. 3 illustrates a communicator, according to an example.

As mentioned earlier, a communicator defines a group of processes that can communicate with one another. Each process in a communicator can expose a portion of memory through a respective window. A "remotely accessible memory data structure" represents the collection of windows of some, and possibly all, processes in a communicator. The windows expose memory regions with which processes can interact one-sidedly. In MPI, MPI_Win represents a remotely accessible memory data structure. As used herein, the term "data structure" refers to a collection of data values, the relationships among them, and the functions or operations that can be applied to the data.

The creation of a remotely accessible memory data structure (e.g., MPI_Win) is a collective operation: each process in a communicator reserves memory for remote access. The message passing procedure can use a remotely accessible memory creation function (akin to the MPI_Win_Create function in MPI) to open a memory window on each process in a communicator. The remotely accessible memory creation function may specify various attributes of a remotely accessible memory (or "window"), for example, an initial address of the window, the size of the window in bytes, or the local unit size for displacements, in bytes. In MPI, for example, the MPI_Win_create function can be used to create an MPI Window object for one-sided communication. As used herein, the term "function" refers to a block of code that performs a task. It can be called and reused multiple times. A function can "take in" data, process it, and "return" a result.

MPI_Win_create allows each process to specify a window in its memory that is made accessible to remote processes. The function call returns an opaque object that represents the group of processes that own and access the set of windows, and the attributes of each window. Example syntax of the MPI_Win_create function is given below:

```
int MPIAPI MPI_Win_create(
    _In_ void *base,
    MPI_Aint size,
    int disp_unit,
    MPI_Info info,
    MPI_Comm comm,
    _Out_ MPI_Win *win
);
``` wherein: (a) the "base" represents the initial address of the window; (b) the "size" represents the size of the window in bytes; (c), the "disp_unit" represents the local unit size for displacements, in bytes; (d) "info" represents "info argument; (e) "comm" represents the communicator that specifies which processes may use RMA to access the array; and (f) "win" represents the window object returned by the call.

In another example, MPI_Win_allocate can be used by each process to specify a window in its memory that is made accessible to other processes. The function call returns an opaque object that represents the group of processes that own and access the set of windows, and the attributes of each window. In the MPI_Win_create function, the memory space exposed through the window is already allocated, unlike in the MPI_Win_allocate function where the window is allocated automatically. Once the window on a target process is available, the origin process (e.g., process 0) can send data to the target process (e.g., process 1), which receives this data without calling any receiving routine. FIG. 2 illustrates this aspect.

In an example implementation, a remotely accessible memory creation function (e.g., MPI_Win allocate in MPI) of a message passing procedure can be modified to include a reference to a region of memory (e.g., 140) in the FAM 112. In an example, a user can modify the remotely accessible memory creation function of the message passing procedure to refer to the region of memory (e.g., 140) in the FAM 112.

In some examples, the remotely accessible memory creation function may be modified as follows. The remotely accessible memory creation function can include a key-value pair object. The key-value pair object can be used to include additional information in the function. For example, the key-value pair object can include an unordered set of key-value pairs. A "key" in the key-value pair can refer to a constant that defines a data set (e.g., gender, color, or price). A "value" in the key-value pair can refer to a value from the data set (e.g., male/female, blue, or $20). A key can have one value. The key-value pair object can be an opaque object such that the object's implementation is hidden from a user. In an example, a user can insert and retrieve any key and a corresponding value of the key through a key-value pair object.

MPI includes a key-value pair object "info" which allows additional information to be included in a function (e.g., MPI_Win_allocate). In MPI, "info" is an opaque object with a handle of type MPI_Info in C language. Example syntax of the MPI_Win_allocate function including a key-value pair object "info" is given below:

```
int MPI_Win_allocate(MPI_Aint size,
    int displacement_unit,
    MPI_Info info,
    MPI_Comm communicator,
    void* base,
    MPI_Win* window);
```

In an example, to modify the remotely accessible memory creation function to include a reference to the FAM 112, a user can update a key-value pair object in the function (e.g., MPI_Win_allocate function in MPI). The user can update the key in the key-value pair object to define a "memory type". Defining the key as "memory type" represents a memory-related functionality of the key-value pair object. The value in the key-value pair object is updated to define the specific type of memory. The user can define the value to refer to the FAM 112. In an example, to provide a reference to the FAM 112, the user can include the value "FAM", in the value field of the key-value pair object. By defining the key as "memory type" and providing "FAM" as the value in the key-value pair object, the user can indicate his/her intention to the remotely accessible memory creation function to create a remotely accessible memory data structure (or "window") in a FAM (e.g., 112).

For example, in MPI, a user can provide the intention to create an MPI window on FAM 112 using the MPI_Info object. A user can create a key with "MEMORY_TYPE" and a corresponding value as "FAM" (where "FAM" is the value used to refer to a region of memory in the FAM 112) and include both into MPI_Info using the MPI_INFO_SET function shown below.

```
MPI_INFO_SET(info, "MEMORY_TYPE", "FAM")
``` where MPI_INFO_SET adds the (key, value) pair to the info object, and overrides the value if a value for the same key was previously set.

Modifying a key-value pair object in a remotely accessible memory creation function (e.g., MPI_Win_allocate function in MPI) in the manner described above acts as an indication to the remotely accessible memory creation function to create a remotely accessible memory data structure (e.g., MPI_Win) in the FAM 112. When an application calls such remotely accessible memory creation function, the remotely accessible memory creation function checks the key-value pair object to determine whether the key includes "memory type" and the value includes "FAM". In response to a determination that the key includes "memory type" and the value includes "FAM", the remotely accessible memory creation function calls a FAM memory allocation function to allocate a region of memory (e.g., 140) in the FAM 112.

In an example, the FAM memory allocation function includes the FAM_allocate function. The FAM_allocate function can be used to allocate space for a data item in a region of memory in a FAM (e.g., 112). The FAM_allocate function returns a descriptor. A "descriptor" refers to a structure containing information that describes data. In the context of FAM, a descriptor refers to an opaque read-only data structure that includes information to uniquely locate a region or data item in a FAM (e.g., 112). A region of memory or data item is addressed by a descriptor in a FAM (e.g., 112). In addition to a FAM address, a descriptor can also include access permissions for an underlying region or a data item. The descriptor returned by the FAM_allocate function is stored in the remotely accessible memory data structure created via the remotely accessible memory creation function.

An example FAM_allocate function is given below:

```
Fam_Descriptor *fam_allocate(char *name, uint64_t nbytes, mode_t
accessPermissions, Fam_Region_Descriptor *region);
``` where "name" represents the name of the data item for subsequent references; "nbytes" represents a requested size of the data item in bytes; "accessPermissions" represents access permissions for this data item; and "region" represents a descriptor for the region where the data item is being created.

In an example, in case the MEMORY_TYPE key is not present in the MPI_Info object, a remotely accessible memory creation function (e.g., MPI_Win_allocate function in MPI) assumes the default behavior (e.g., the current behavior without "FAM") and can allocate the memory from local memory (e.g. RAM).

Once the key-value object pair is defined in a remotely accessible memory creation function (e.g., MPI_Win_allocate in MPI), the function creates a remotely accessible memory data structure (e.g., MPI_Win window) representing the remotely accessible memory ("window"). For example, in MPI, once the key-value object pair (MEMORY_TYPE", "FAM") is defined via "info" object, the MPI_Win_allocate function creates a "window" object representing a remotely accessible memory, as shown below.

```
int MPI_Win_allocate(MPI_Aint size,
    int displacement_unit,
    MPI_Info (info, "MEMORY_TYPE", "FAM"),
    MPI_Comm communicator,
    void *base,
    MPI_Win window);
```

In an example, the application 120 can call 122 a message passing function of the message passing procedure. In the message passing procedure, a "message passing function" refers to a function used to transfer data to or from a remote memory access region of a process (or "window"). Message passing functions can include, for example, a "write" function or a "read" function. A "write" function can be used to one-sidedly send data to the window of another process. In MPI, for example, MPI_Put can be used to one-sidedly send data to the window of another MPI process. A "read" function can be used to one-sidedly fetch data from the window of another process. In MPI, for example, MPI_Get can be used to one-sidedly fetch data from the window of another MPI process.

In response to the call 122 from the application 120 to the message passing function of the message passing procedure, a determination is made during the execution of the function whether a remotely accessible memory data structure in the message passing function includes a reference to a region of memory in the FAM 112.

In response to a determination that the remotely accessible memory data structure in the message passing function includes a reference to a region of memory in the FAM 112, the function call is routed 124 to a FAM message passing function corresponding to the message passing function of the message passing procedure. FAM message passing functions can refer to functions used to transfer data to or from a FAM. FAM message passing functions can include, for example, a "write" function or a "read" function. A write function can be used to copy data items from local memory to a FAM. In OpenFAM, for example, the fam_put function can be used to copy data items from local memory to a FAM. A read function can be used to copy data from a FAM to a local memory. In OpenFAM, for example, the fam_get function can be used to copy data from a FAM to a local memory.

In an example, routing comprises forwarding the function call to a FAM message passing function (e.g., OpenFAM fam_put function) that facilitates the application 120 on a compute node to copy data from local memory on the compute node to a region of memory in the FAM 112. In another example, routing comprises forwarding the function call to the FAM message passing function (e.g., OpenFAM fam_get function) that facilitates the application 120 on a compute node to fetch data from a region of memory in the FAM 112 to local memory on the compute node.

In an example, routing comprises forwarding the function call to a FAM memory allocation function that allocates 126 a region of memory (or "FAM region") 140 in the FAM 112. In OpenFAM, for example, the fam_allocate function can be used to create a data item of a specified size in a region of memory (e.g., 140) in the FAM 112.

Once the FAM memory allocation function allocates a region of memory 140 in the FAM 112, the memory 140 allocated in the FAM 112 is accessible to the message passing function of the message passing procedure via the corresponding FAM message passing function. For example, if the application 120 calls a write function of the message passing procedure (akin to MPI_Put in MPI), the call is routed to a corresponding write function of the FAM (akin to OpenFAM fam_put), which allows the write function of the message passing procedure to access a region of memory allocated in the FAM 112. In another example, if the application 120 calls a read function of the message passing procedure (akin to MPI_Get in MPI), the call is routed to a corresponding read function of the FAM (akin to OpenFAM fam_get), which allows the read function of the message passing procedure to access a region of memory allocated in the FAM 112

FIG. 2 illustrates a one-sided communication, according to an example. As shown in FIG. 2, an origin process (e.g., process 0) 202 on a first compute node 212 may put data 204 directly into the memory 206 of a target process (e.g., process 1) 208 on a second compute node 214, without the target process 208 using an explicit receive call. FIG. 2 also illustrates a window 210 on the target process 208. The target process (e.g., process 1) 208 exposes a portion of memory (or "window") 210, which is visible for the origin process (e.g., process 0) 202 to manipulate.

FIG. 3 illustrates a communicator 300 comprising two processes (process 0 and process 1) 302 and 304 on compute nodes 320 and 322, respectively. Both process 0 and process 1 expose a portion of their respective memory 306 and 308 through their respective windows 310 and 312. In an example, process 0 can be the origin process, and process 1 can be the target process. In such case, process 0 can manipulate (e.g., store data) the window of process 1. In another example, process 1 can be the origin process, and process 0 can be the target process. In such case, process 1 can manipulate (e.g., store data) the window of process 0. In an example, a remotely accessible memory data structure can collectively represent windows 310 and 312 exposed by process 0 and process 1, respectively.

Figure 4:
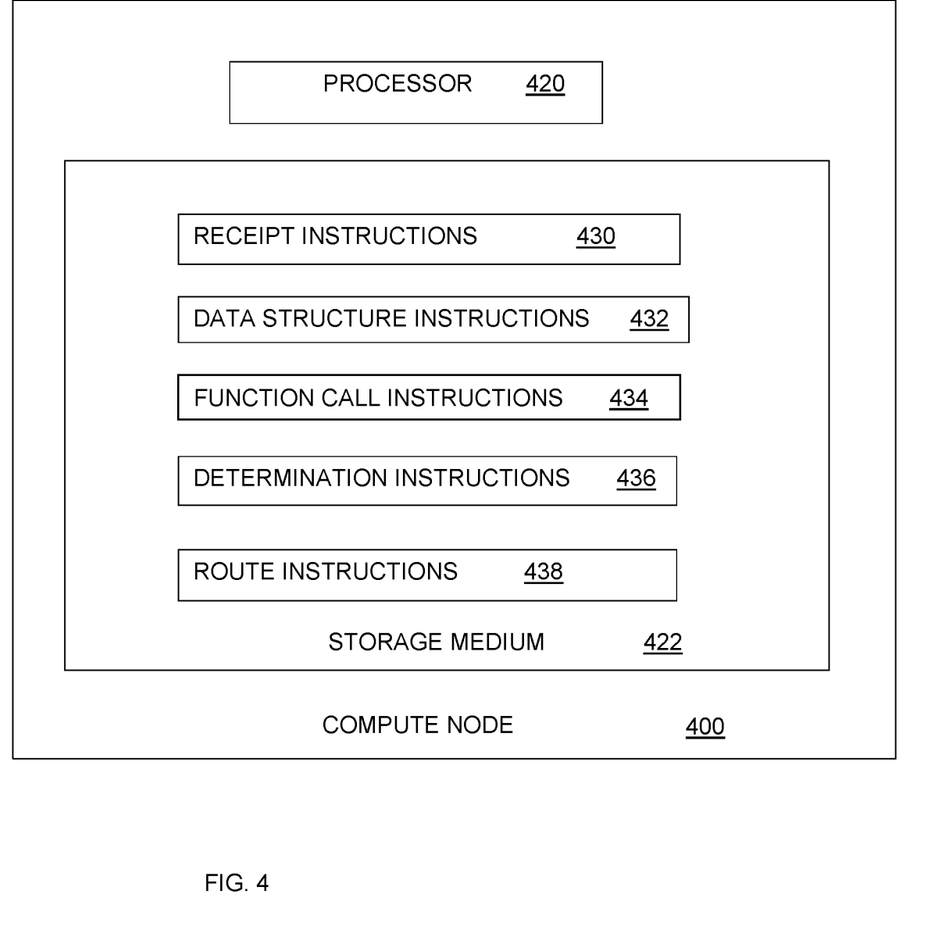
FIG. 4 is a block diagram of a compute node, according to some examples.

FIG. 4 illustrates a compute node 400 of the computing environment of FIG. 1, according to some examples. The compute node can be analogous to a compute node (e.g., 102) of FIG. 1, in which like reference numerals correspond to the same or similar, though perhaps not identical components. For the sake of brevity, components or reference numerals of FIG. 4 having the same or similarly described function in FIG. 1 are not being described in connection with FIG. 4. Said components or reference numerals may be considered alike.

The compute node 400 can include a processor 420 (or multiple processors) and a storage medium 422. Processor 420 can include a Central Processing Unit (CPU), a microprocessor, a programmable gate array, a microcontroller, or any other processing logic that interprets and executes machine-readable instructions stored in storage medium 422.

The storage medium 422 can store information and machine-readable instructions executable on the processor 420 to perform various tasks. The storage medium 422 can be Synchronous DRAM (SDRAM), Double Data Rate (DDR), Rambus DRAM (RDRAM), Rambus RAM, etc., or storage memory media such as a floppy disk, a hard disk, a CD-ROM, a DVD, a pen drive, and the like.

In an example, the processor 420 executes receipt instructions 430 to receive an input (e.g., from a user) to modify a remotely accessible memory creation function of a message passing procedure to include a reference to a region of memory in a FAM. The input includes modifying a key-value pair object in the remotely accessible memory creation function to include a reference (e.g., a descriptor) to a region of memory in the FAM.

The processor 420 executes data structure instructions 432 to create a remotely accessible memory data structure representing a remotely accessible memory through the remotely accessible memory creation function. The processor 420 executes function call instructions 434 to receive a function call to a message passing function of a message passing procedure from an application. The message passing function includes the remotely accessible memory data structure of the message passing procedure that references a region of memory in the FAM. In an example, the remotely accessible memory data structure of the message passing procedure includes a key-value pair object. The key-value pair object includes a key that defines a data set and a value that belongs to the data set. In an example, in the key-value pair object, the key is defined as "memory type" and a reference to the FAM is included in the value field.

The processor executes determination instructions 436 to determine whether the message passing function includes a remotely accessible memory data structure of the message passing procedure that references a region of memory in the FAM. In an example, the determination includes referring to the value in the key-value pair object in the remotely accessible memory data structure and determining whether the value includes a reference to a region of memory in the FAM.

In response to a determination that the remotely accessible memory data structure in the message passing function references a region of memory in the FAM, the processor executes route instructions 438 to route the function call to a FAM message passing function corresponding to the message passing function of the message passing procedure.

Figure 5:
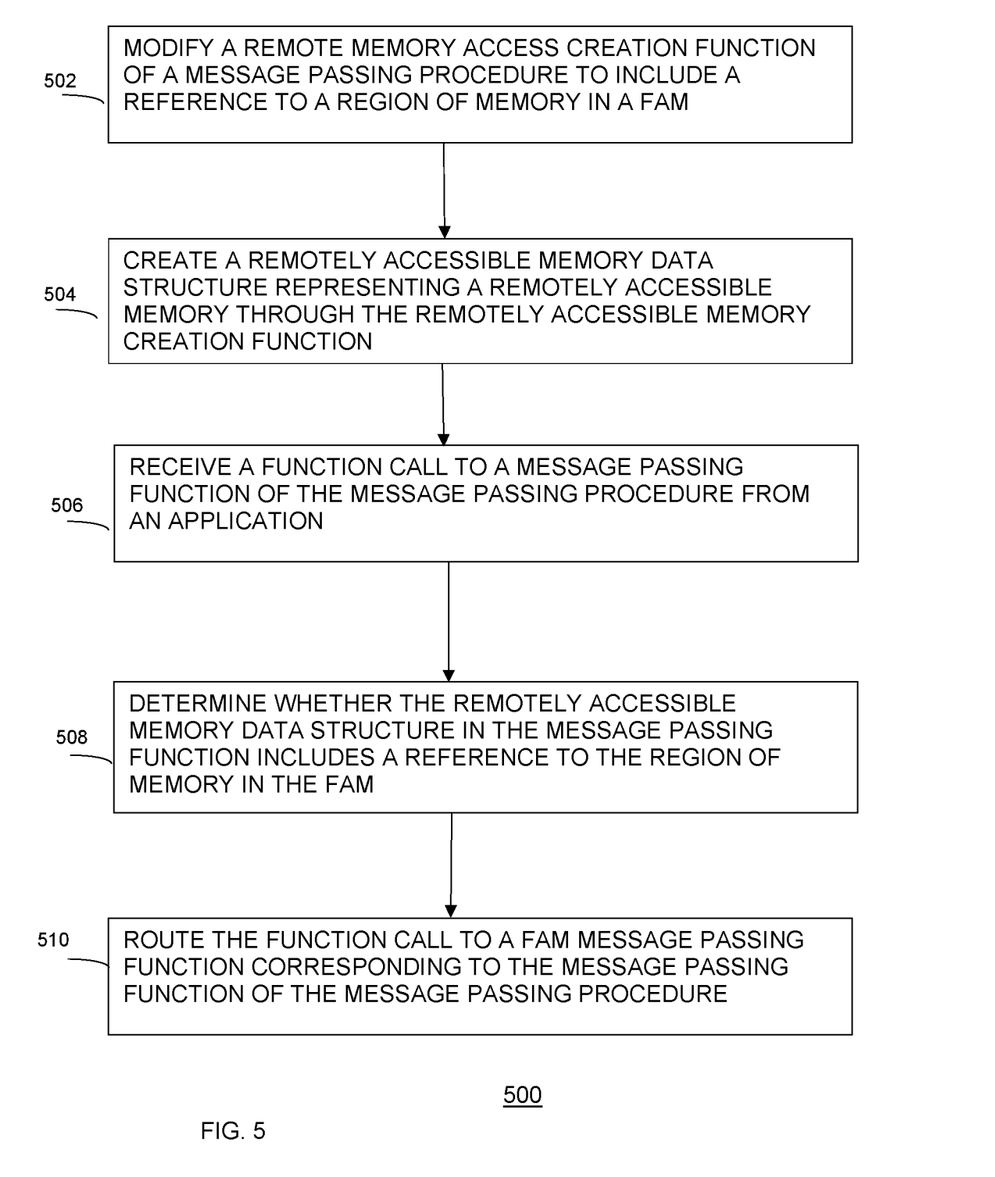
FIG. 5 is a flowchart of a method, according to some examples.

FIG. 5 is a flowchart of method 500, according to some examples. Method 500 can be performed by a system including a processor, where the system can include a computer or multiple computers. For example, method 500 can at least partially be executed on a compute node (e.g., 102) of FIG. 1 or the compute node 400 of FIG. 4.

At block 502, method 500 includes modifying a remotely accessible memory creation function access data structure of a message passing procedure to include a reference to a region of memory in a FAM. In an example, modifying comprises accessing a key-value pair object in the remotely accessible memory creation function of the message passing procedure. The key in the key-value pair is updated to define a memory type and the value is updated to include a reference to a region of memory in the FAM.

At block 504, method 500 includes creating a remotely accessible memory data structure representing a remotely accessible memory through the remotely accessible memory creation function. The remotely accessible memory data structure is created by the message passing procedure.

At block 506, method 500 includes receiving a function call to a message passing function of the message passing procedure from an application, wherein the message passing function includes the remotely accessible memory data structure of the message passing procedure. In an example, receiving comprises receiving the function call to the message passing function that facilitates a process to one-sidedly fetch data from a window of a second process. The process and the second process use the message passing procedure. In another example, receiving comprises receiving the function call to the message passing function that facilitates the process to one-sidedly send data to a window of the second process.

At block 508, method 500 includes determining whether the remotely accessible memory data structure in the message passing function includes a reference to the region of memory in the FAM. At block 510, in response to determining that the remotely accessible memory data structure in the message passing function includes a reference to the region of memory in the FAM, method 500 includes routing the function call to a FAM message passing function corresponding to the message passing function of the message passing procedure. In an example, routing comprises forwarding the function call to the FAM message passing function that facilitates the application on a compute node to copy data from local memory on the compute node to the FAM. In another example, routing comprises forwarding the function call to the FAM message passing function that facilitates the application on a compute node to fetch data from the FAM to local memory on the compute node.

Figure 6:
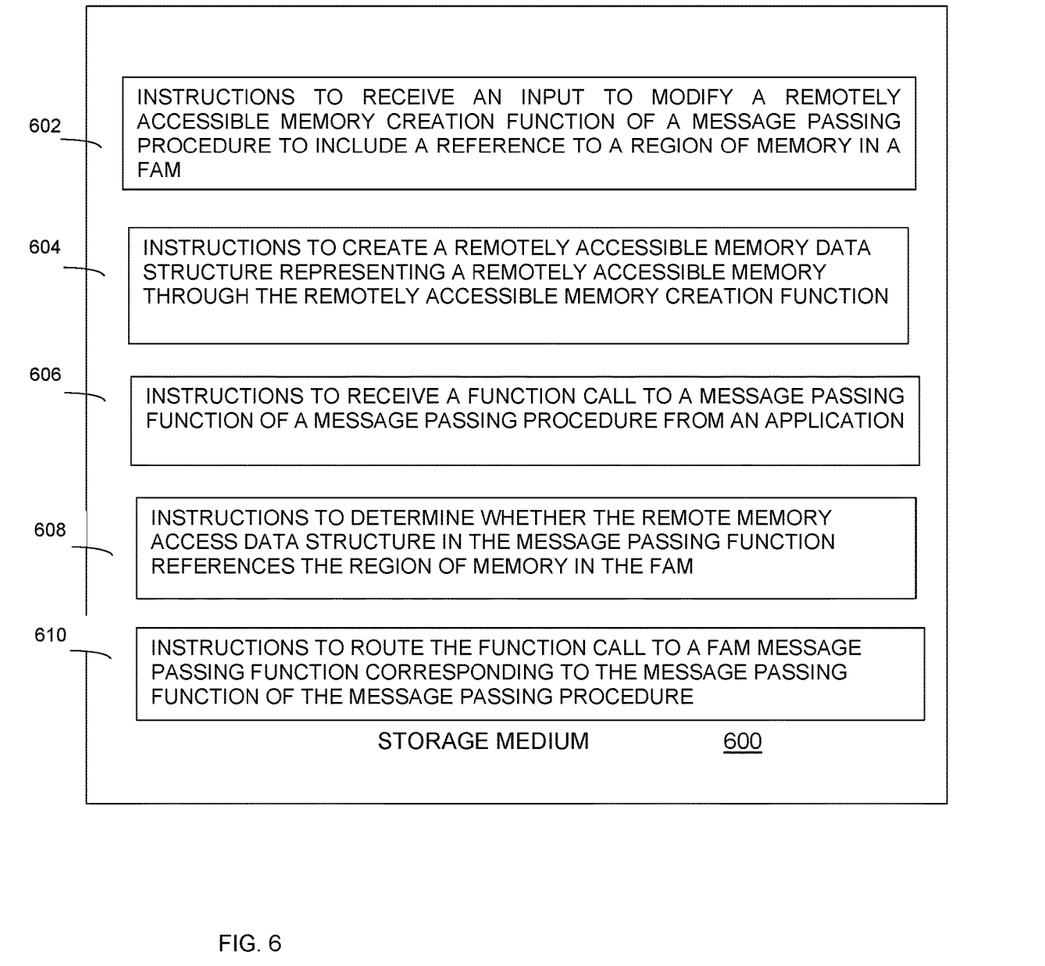
FIG. 6 is a block diagram of a storage medium storing machine-readable instructions, according to some examples.

FIG. 6 is a block diagram of a non-transitory machine-readable or computer-readable storage medium 600 storing machine-readable instructions that upon execution cause a system to perform various tasks. The system can include a compute (e.g., 102 of FIG. 1) or a collection of compute nodes (e.g., 102-108 of FIG. 1).

The machine-readable instructions include instructions 602 to receive an input to modify a remotely accessible memory creation function of a message passing procedure to include a reference to a region of memory in a FAM. In an example, the input is received from a user. The input includes modifying a key-value pair object in the remotely accessible memory creation function to include a reference (e.g., a descriptor) to a region of memory in the FAM.

The machine-readable instructions include instructions 604 to create a remotely accessible memory data structure representing a remotely accessible memory through the remotely accessible memory creation function. The machine-readable instructions include instructions 606 to receive a function call to a message passing function of a message passing procedure from an application. The message passing function includes a remotely accessible memory data structure of the message passing procedure that references a region of memory in the FAM.

In an example, instructions 606 include instructions to receive a function call to a message passing function that facilitates a process to one-sidedly fetch data from a window of a second process, wherein the process and the second process use the message passing procedure. In another example, instructions 606 include instructions to receive a function call to a message passing function that facilitates a process to one-sidedly send data to a window of a second process, wherein the process and the second process use the message passing procedure.

The machine-readable instructions include instructions 608 to determine whether the remotely accessible memory data structure in the message passing function references the region of memory in the FAM. The machine-readable instructions include instructions 610 to route the function call to a FAM message passing function corresponding to the message passing function of the message passing procedure, in response to a determination that the remotely accessible memory data structure in the message passing function references the region of memory in the FAM. In an example, instructions 610 include instructions to forward the function call to the FAM message passing function that facilitates the application on a compute node to copy data from local memory on the compute node to the region of memory in the FAM.

For simplicity of explanation, the example method of FIG. 5 is shown as executing serially, however, it is to be understood and appreciated that the present and other examples are not limited by the illustrated order. The example systems of FIGS. 1, 2, 3, 4, and 6, and the method of FIG. 5 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general-purpose or special-purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general-purpose or special-purpose computer. The computer-readable instructions can also be accessed from memory and executed by a processor.

It should be understood that the above-described examples of the present solution are for illustration. Although the solution has been described in conjunction with a specific example thereof, numerous modifications may be possible without materially departing from the teachings and advantages of the subject matter described herein. Other substitutions, modifications, and changes may be made without departing from the spirit of the present solution. All of the features disclosed in this specification (including any accompanying claims, abstract, and drawings), and/or all of the steps of any method or process so disclosed, may be combined in any combination, except combinations where at least some of such features and/or steps are mutually exclusive.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on one claim, the disclosure of various implementations includes each dependent claim in combination with every other claim in the claim set.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

As used herein, the articles "a" and "an" are intended to include one or more items and may be used interchangeably with "one or more." Further, as used herein, the article "the" is intended to include one or more items referenced in connection with the article "the" and may be used interchangeably with "the one or more." Also, as used herein, the terms "has," "have," "having," or the like are intended to be open-ended terms. As used herein, the term "includes" is intended to mean "includes but not limited to", and the term "including" is intended to mean "including but not limited to". Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The invention claimed is:

1. A method comprising:
modifying a remotely accessible memory creation function of a message passing procedure to include a reference to a region of memory in a Fabric-Attached Memory (FAM);
creating a remotely accessible memory data structure representing a remotely accessible memory through the remotely accessible memory creation function;
receiving a function call to a message passing function of the message passing procedure from an application, wherein the message passing function includes the remotely accessible memory data structure of the message passing procedure; and
in response to determining that the remotely accessible memory data structure in the message passing function includes the reference to the region of memory in the FAM, routing the function call to a FAM message passing function corresponding to the message passing function of the message passing procedure.

2. The method of claim 1, wherein the remotely accessible memory creation function of the message passing procedure includes a key-value pair object, wherein the key-value pair object includes a key that defines a data set and a value that belongs to the data set.

3. The method of claim 2, wherein modifying includes:
accessing the key-value pair object in the remotely accessible memory creation function of the message passing procedure; and
updating the key-value pair object.

4. The method of claim 3, wherein updating comprises:
defining the key as memory type; and
including a reference to the FAM as the value in the key-value pair object.

5. The method of claim 3, further comprising determining whether the remotely accessible memory data structure in the message passing function includes the reference to the region of memory in the FAM.

6. The method of claim 5, wherein creating comprises:
calling a FAM memory allocation function to allocate the region of memory in the FAM;
receiving a descriptor, from the FAM memory allocation function, identifying the region of memory in the FAM; and
storing the descriptor in the remotely accessible memory data structure.

7. The method of claim 1, wherein receiving comprises receiving the function call to the message passing function that facilitates a process to one-sidedly fetch data from a window of a second process, wherein the process and the second process use the message passing procedure.

8. The method of claim 1, wherein receiving comprises receiving the function call to the message passing function that facilitates a process to one-sidedly send data to a window of a second process, wherein the process and the second process use the message passing procedure.

9. The method of claim 1, wherein routing comprises forwarding the function call to the FAM message passing function that facilitates the application on a compute node to copy data from local memory on the compute node to the region of memory in the FAM.

10. The method of claim 1, wherein routing comprises forwarding the function call to the FAM message passing function that facilitates the application on a compute node to fetch data from the region of memory in the FAM to local memory on the compute node.

11. The method of claim 1, further comprising allocating the region of memory in the FAM that is accessible to the message passing function of the message passing procedure via the FAM message passing function.

12. A compute node comprising:
a processor; and
a non-transitory storage medium storing instructions that, when executed by the processor, cause the compute node to:
receive an input to modify a remotely accessible memory creation function of a message passing procedure to include a reference to a region of memory in a FAM;
create a remotely accessible memory data structure representing a remotely accessible memory through the remotely accessible memory creation function;
receive a function call to a message passing function of a message passing procedure from an application, wherein the message passing function includes a remotely accessible memory data structure of the message passing procedure that references the region of memory in the FAM; and
in response to a determination that the remotely accessible memory data structure in the message passing function references the region of memory in the FAM, route the function call to a FAM message passing function corresponding to the message passing function of the message passing procedure.

13. The compute node of claim 12, wherein the instructions, when executed by the processor, further cause the compute node to determine whether the remotely accessible memory data structure in the message passing function includes the reference to the region of memory in the FAM.

14. The compute node of claim 12, wherein the instructions, when executed by the processor, further cause the compute node to determine whether the remotely accessible memory data structure includes a key-value pair object, wherein the key-value pair object includes a key that defines a memory type and a value that includes a reference to the FAM.

15. The compute node of claim 12, wherein the FAM message passing function includes a memory allocation function that allocates the region of memory in the FAM.

16. A non-transitory machine-readable storage medium comprising instructions that upon execution cause a compute node to:
receive an input to modify a remotely accessible memory creation function of a message passing procedure to include a reference to a region of memory in a FAM;
create a remotely accessible memory data structure representing a remotely accessible memory through the remotely accessible memory creation function;
receive a function call to a message passing function of a message passing procedure from an application, wherein the message passing function includes a remotely accessible memory data structure of the message passing procedure that references a region of memory in the FAM; and
in response to a determination that the remotely accessible memory data structure in the Message passing function references the region of memory in the FAM, route the function call to a FAM message passing function corresponding to the message passing function of the message passing procedure.

17. The non-transitory machine-readable storage medium of claim 16, wherein the FAM includes non-volatile memory on multiple servers.

18. The non-transitory machine-readable storage medium of claim 16, wherein the FAM includes byte-addressable memory.

19. The non-transitory machine-readable storage medium of claim 16, wherein the application is present on a compute node communicatively coupled to the FAM over a network fabric.

20. The non-transitory machine-readable storage medium of claim 19, wherein the network fabric includes an interconnect.

* * * * *